(No Model.)
O. A. LEE.
FORK.
No. 308,907. Patented Dec. 9, 1884.
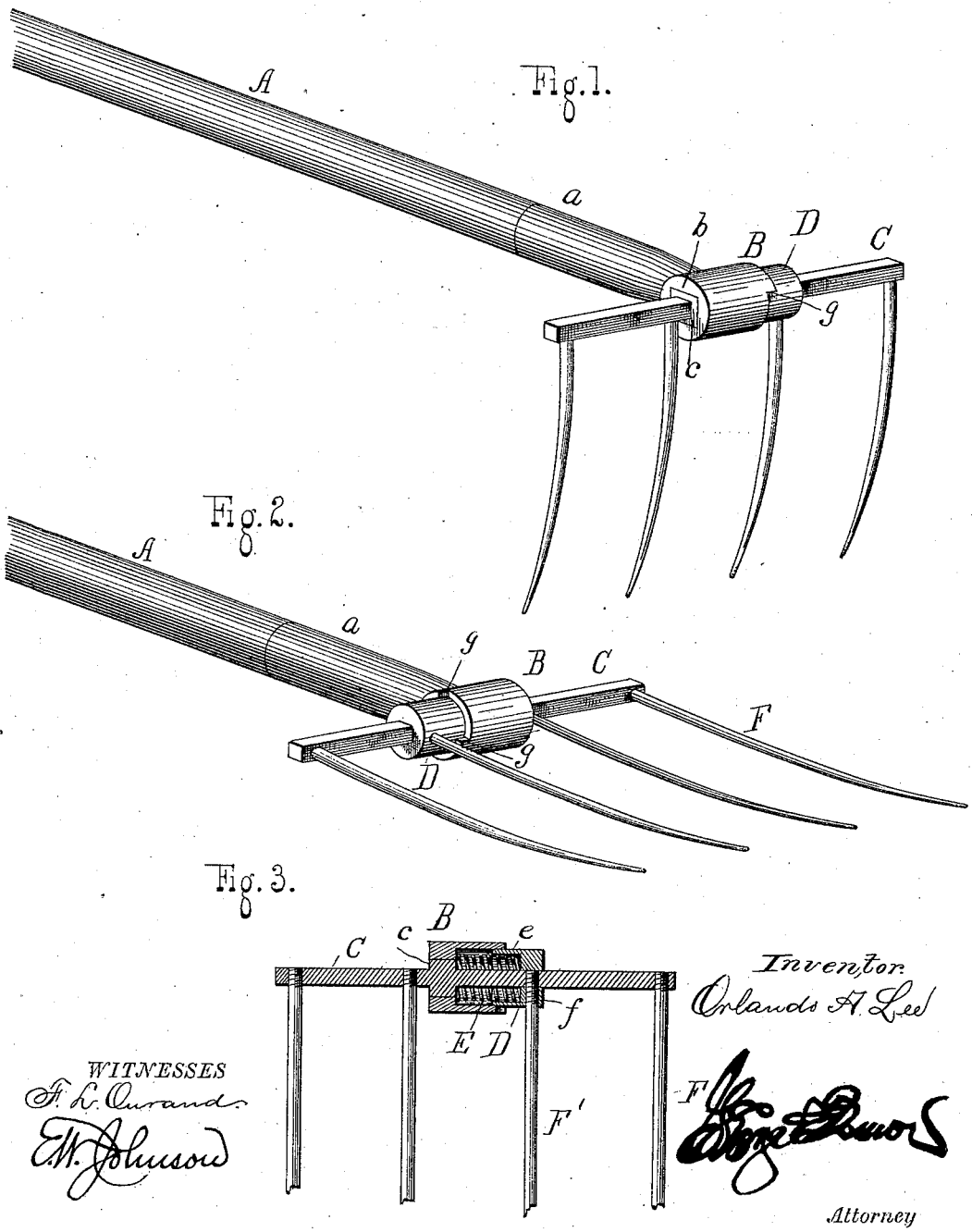
WITNESSES
Inventor
Orlando A. Lee
Attorney

UNITED STATES PATENT OFFICE.

ORLANDO A. LEE, OF MANSFIELD, OHIO.

FORK.

SPECIFICATION forming part of Letters Patent No. 308,907, dated December 9, 1884.

Application filed March 3, 1884. (No model.)

*To all whom it may concern:*

Be it known that I, ORLANDO A. LEE, a citizen of the United States of America, residing at Mansfield, in the county of Richland and State of Ohio, have invented certain new and useful Improvements in Forks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to combined hay-forks and rakes; and it consists in the improvements hereinafter described and set forth.

In the accompanying drawings, Figure 1 is a perspective view of an implement constructed in accordance with my invention and adjusted to be used as a rake. Fig. 2 is a perspective view showing the implement to be used and arranged as a fork, and Fig. 3 is a transverse section through the rake or fork head.

On the end of a handle, A, is a ferrule, $a$, to strengthen said end, into which is driven the shank of a sleeve, B. One end of said sleeve B is closed by a head, $b$, which is centrally provided with a square perforation, while the other end of said sleeve is open, the body of the sleeve being recessed, as shown in Fig. 3. A bar, C, extends longitudinally through the square opening of the same, but is of smaller dimensions than said opening. The said bar C carries a block, $c$, adapted to fit into the square recess in the head $b$ and prevent the rotation of the bar C. The bar C has rigidly secured to said rod $c$ a shell, D, the body portion $e$ of which plays concentrically in the sleeve B. A spiral expanding spring, E, embraces the rod C in the sleeve-recess, and bears at its ends, respectively, against the head $b$ of said sleeve B, and against the head $f$, formed by the end of the shell D. The ends of the fork-teeth F are screw-threaded for attachment to the bar C, one of said teeth, F', however, of necessity piercing the shell B and entering the bar C, as shown in Fig. 3. A portion of the edge of the shell B is cut away, as shown in Figs. 1 and 2, to form shoulders $g$.

When it is desired to change the position of the implement with respect to the handle for use either as a fork or rake, the shell is pressed inward against the spring-pressure, and thus moves the block $c$ from its bearing in the square opening in the head $b$, and permits the rotation of the shaft, so as to turn the bar C with the forks. The arrangement of the shoulders $g$ is such that when the shell is pressed inward the tooth F' will play in the cut-away portion and limit the rotation of the bar C, so that the said bar C can only rotate sufficiently in either direction to bring the block $c$ in proper position to be moved into the square opening in the head $b$ by the spring E when pressure is removed from the shell.

From the foregoing it will be apparent that an implement constructed in accordance with my invention is of cheap, simple, and durable construction, and that it can be readily manipulated to change the position of the fork or rake head with respect to the handle by a movement transverse to the strain caused by the weight of the substance being lifted by the fork. Moreover, the parts are always automatically locked in position.

It will be obvious that by slight modification and change a shovel-blade or other article may be substituted for the fork or rake head, and operate in substantially the same manner for use as a shovel and hoe.

I claim—

1. The combination, in a combined agricultural implement, of a handle, a sleeve located at the end of said handle, a bar carrying the implement and locked in position in said sleeve, and adapted by a lateral movement to become unlocked, substantially as set forth.

2. The combination, in a combined fork or rake, of a handle, a sleeve located at the end of said handle, a bar carrying the fork-teeth and locked in position in said sleeve, and adapted by a lateral movement to become unlocked, and spring devices for moving said bar to its first position and relocking the same, substantially as set forth.

3. The combination, in a combined fork or rake, of a handle, a sleeve located at the end of said handle and provided with a head, and designed by a lateral movement to effect the disengagement of said block from said opening, having a perforation, a bar passing through said perforation and carrying the rake-teeth, and provided with a block adapted to fit in said opening in the sleeve-head, substantially as set forth.

4. The combination, in a combined fork and rake, of a handle, a sleeve located at the end thereof, and provided with a head having a perforation, a bar passing through said perforation and carrying the fork-teeth, and provided with a block adapted to fit said perforation in the sleeve-head, and spring devices for normally retaining said block in said perforation, substantially as described.

5. The combination, in a combined fork and rake, of a handle, a sleeve located at the end of said handle, a bar carrying the fork-teeth, and spring-actuated shell located concentrically in the sleeve, and adapted to hold the bar in engagement with the fork-teeth, substantially as described.

6. The combination, in a combined fork and rake, of a handle, a sleeve located at the end thereof, and provided with a head having a perforation, a bar passing through said perforation carrying the fork-teeth, and provided with a block adapted to fit said perforation in the sleeve-head, a shell secured to said bar and located concentrically in said sleeve, and a spring interposed between said sleeve-head and shell, substantially as set forth.

7. The combination, in a combined fork and rake, operating substantially as described, of a sleeve cut away to form shoulders $g$, a bar passing through said sleeve, and adapted, when moved laterally, to be revolved, one of the teeth of said bar contacting with the shoulders $g$ when the said bar is revolved, as and for the purpose specified.

In testimony whereof I affix my signature in presence of two witnesses.

ORLANDO A. LEE.

Witnesses:
AUTHER STEVENSON,
FRANKLIN P. WISE.